(12) United States Patent
Smith et al.

(10) Patent No.: US 7,215,472 B2
(45) Date of Patent: May 8, 2007

(54) WIDE-ANGLE BEAM STEERING SYSTEM

(75) Inventors: Irl W. Smith, Concord, MA (US);
Michael Karl Oskar Holz, Newton, MA (US)

(73) Assignee: Raytheon Company, Waltham, MA (US)

( * ) Notice: Subject to any disclaimer, the term of this patent is extended or adjusted under 35 U.S.C. 154(b) by 1 day.

(21) Appl. No.: 10/916,916

(22) Filed: Aug. 12, 2004

(65) Prior Publication Data

US 2006/0033995 A1    Feb. 16, 2006

(51) Int. Cl.
*G02B 27/44* (2006.01)
(52) U.S. Cl. ......................... 359/568; 359/576
(58) Field of Classification Search ............... 359/566, 359/568, 576, 15; 385/37, 24, 27, 17, 18
See application file for complete search history.

(56) References Cited

U.S. PATENT DOCUMENTS

| | | | |
|---|---|---|---|
| 3,980,389 | A | 9/1976 | Huignard et al. |
| 5,093,740 | A | 3/1992 | Dorschner et al. |
| 5,126,869 | A | 6/1992 | Lipchak et al. |
| 5,253,033 | A * | 10/1993 | Lipchak et al. ............ 356/4.01 |
| 5,771,320 | A | 6/1998 | Stone |
| 5,963,682 | A | 10/1999 | Dorschner et al. |
| 6,586,141 | B1 | 7/2003 | Efimov et al. |
| 6,673,497 | B2 | 1/2004 | Efimov et al. |
| 2001/0033400 | A1 * | 10/2001 | Sutherland et al. ........... 359/15 |
| 2002/0186919 | A1 * | 12/2002 | Pepper ........................ 385/27 |
| 2005/0031264 | A1 * | 2/2005 | Volodin et al. ............... 385/37 |
| 2005/0069245 | A1 * | 3/2005 | Mitchell et al. .............. 385/17 |

OTHER PUBLICATIONS

Ali Adibi, Secondary Grating Formation by Readout at Bragg-Null Incidence, Jul. 10, 1999, vol. 38, No. 20, Applied Optics, Pasadena, California.
O.M. Efimov, High-Frequency Bragg Gratings In A Photothermorefractive Glass, Dec. 1, 2000, vol. 25, No. 23, Optic Letters, Orlando, Florida.

(Continued)

*Primary Examiner*—Fayez G. Assaf
(74) *Attorney, Agent, or Firm*—Daly, Crowley, Mofford & Durkee, LLP (57) ABSTRACT

A beam steering system having first diffraction gratings, each one being associated with a corresponding one of a first plurality of grating vectors disposed substantially in a first plane. The gratings diffract optical energy from any one of a plurality of input directions of resonance to a corresponding one of a plurality of output directions. Second diffraction gratings are associated with a second plurality of grating vectors disposed substantially in a second plane. Each one of the second gratings diffracts optical energy from any one of a plurality of input directions of resonance to a corresponding one of a plurality of output directions. An arrangement directs a beam of optical energy to a selected one of the first gratings along a selected one of the plurality of input directions for the selected one of the first gratings, selected to provide the corresponding one of the output directions from the first gratings to be substantially equal to a selected one of the plurality of input directions for the selected one of the second gratings, thereby providing a selectable set of beam output directions.

6 Claims, 5 Drawing Sheets

OTHER PUBLICATIONS

PCT/US2005/026111 International Search Report dated Nov. 28, 2005.

S.C. Barden, J.B. Williams, Tunable Gratings: Imaging the Universe In 3-D with Volume-Phase Holographic Gratings, 2000, pp. 552-563, vol. 195, Astronomical Society of the Pacific Conference Series, Sanfransico, California.

Paul F. McManamon, Edward A. Watson, Applications Look At The Use of Liquid Crystal Writable Gratings for Steering Passive Radiation, Nov. 1, 1993, pp. 2657-2664, vol. 32, No. 11, Optical Engineering Society of Photo-Optical Instrumentation Engineers, Bellingham, USA.

A.L. Dmitriev, A.V. Ivanov, Deflector with Holographic Amplifier of the Deflection Angle, Feb. 1, 1989, pp. 258-260, vol. 66, No. 2, Washington, D.C.

* cited by examiner

WIDE-ANGLE BEAM STEERING SYSTEM

TECHNICAL FIELD

This invention relates generally to beam steering systems and more particularly to electronically controlled wide angle beam steering systems.

BACKGROUND

As is known in the art, optical phased array beam steering systems have been described for steering an optical beam in accordance with electrical command signals. One such beam steerer is described in U.S. Pat. No. 5,093,740 entitled "Optical Beam Steerer Having Subaperture Addressing" issued Mar. 3, 1992, inventors Dorschner et al, U.S. Pat. No. 5,963,682 issued Oct. 5, 1999, inventors Dorschner et al., and U.S. Pat. No. 6,704,474 issued Mar. 9, 2004, inventors Dorschner et al. all assigned to the assignee of the present patent application, the entire subject matter of all such U.S. patents being incorporated herein by reference. As described therein, the beam steerer includes an array of optical phase shifters. The phase shift provided to that portion of a beam of optical energy which passes through each phase shifter is selected by an electrical control signal fed to the phase shifter. An incident beam of optical energy, as from a laser, is thereby angularly directed (i.e., deflected) in accordance with the spatially varying phase shift provided by the array of phase shifters.

While such an arrangement is effective in providing relatively small angular deflections for the incident beams, say ±5 degrees, in some applications it would be desirable to deflect the incident beam by larger angles, say in the order of ±50 degrees.

SUMMARY

In accordance with the present invention, a beam steering system is provided having a first plurality of volume diffraction gratings. Each one of the gratings is associated with a corresponding one of a first plurality of grating vectors. The first plurality of grating vectors is disposed substantially in a first plane. Each one of the gratings is arranged to diffract optical energy incident thereon from any one of a plurality of input directions of resonance to a corresponding one of a plurality of output directions. The system includes a second plurality of volume diffraction gratings. Each one of such second plurality of volume diffraction gratings is associated with a corresponding one of a second plurality of grating vectors. The second plurality of grating vectors is disposed substantially in a second plane different from the first plane. Each one of the second plurality of grating vectors is arranged to diffract optical energy incident thereon from any one of a plurality of input directions of resonance to a corresponding one of a plurality of output directions. Also provided is a beam steering arrangement for deflecting a beam of optical energy incident on the beam steering system such that it is directed first to a selected one of the first plurality of gratings along a selected one of the plurality of input directions of resonance for the selected one of the first plurality of gratings and then directed to the second plurality of gratings in a direction substantially equal to a selected one of the plurality of input directions of resonance for the selected one of the second plurality of gratings.

In one embodiment, the beam steering arrangement is disposed in front of both the first plurality of gratings and the second plurality of gratings.

In one embodiment, a first portion of the beam steering arrangement is disposed in front of the first plurality of gratings and a second portion of the beam steering arrangement is disposed between the first plurality of gratings and the second plurality of gratings, such second portion of the beam steering arrangement shifting the output direction from the first gratings to one of the plurality of the input direction of the second gratings.

In one embodiment, the beam steering arrangement includes an electro-optical beam steerer arrangement.

In one embodiment, the electro-optical beam steerer arrangement includes an array of electrically controllable phase shifting elements for deflecting the optical energy to the first plurality of gratings at an angle in the first plane and for deflecting from the first plurality of gratings at an angle in the second plane.

In accordance with one embodiment, each portion of the beam steering system includes an array of electrically controllable phase shifting elements for deflecting the optical energy incident thereupon, the deflection angle for the first portion of the electro-optical beam steerer arrangement lying in a first plane of deflection and the deflection angle for the second portion thereof lying in a second plane, said second plane lying at an angle to the first plane.

In accordance with one embodiment, a beam steering system is provided having a first electro-optical beam steerer. The first electro-optical beam steerer includes a first array of electrically controllable phase shifting elements for directing an incident beam to a selected one of a plurality of first angles in a first plane. Each one of such first angles is selected in accordance with a first electrical command fed to the phase shifting elements of the first electro-optical beam steerer. The system includes a first grating set having a grating material to intercept the beam directed by the first electro-optical beam steerer and which deflects such directed beam by one of a first plurality of angles, each one of the corresponding deflected beam directions being confined substantially to the first plane. The system includes a second electro-optical beam steerer comprising a second array of electrically controllable phase shifting elements for deflecting the beam steered by the first grating set by a selected one of a plurality of second angles, said deflections lying in a second plane different from the first plane. Each one of such second angles is selected in accordance with a second electrical command fed to the phase shifting elements of the a second electro-optical beam steerer. The system includes a second grating set having a grating material to intercept the beam directed by the second electro-optical beam steerer and which deflects such directed beam by one of a second plurality of angles into a corresponding second plurality of beam directions. Each one of the second plurality of deflections is confined substantially to a second plane, such second plane being different from the first plane. In one embodiment, the second plane is perpendicular to the first plane.

In one embodiment, the grating material of the first and second grating sets is photothermorefractive glass.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
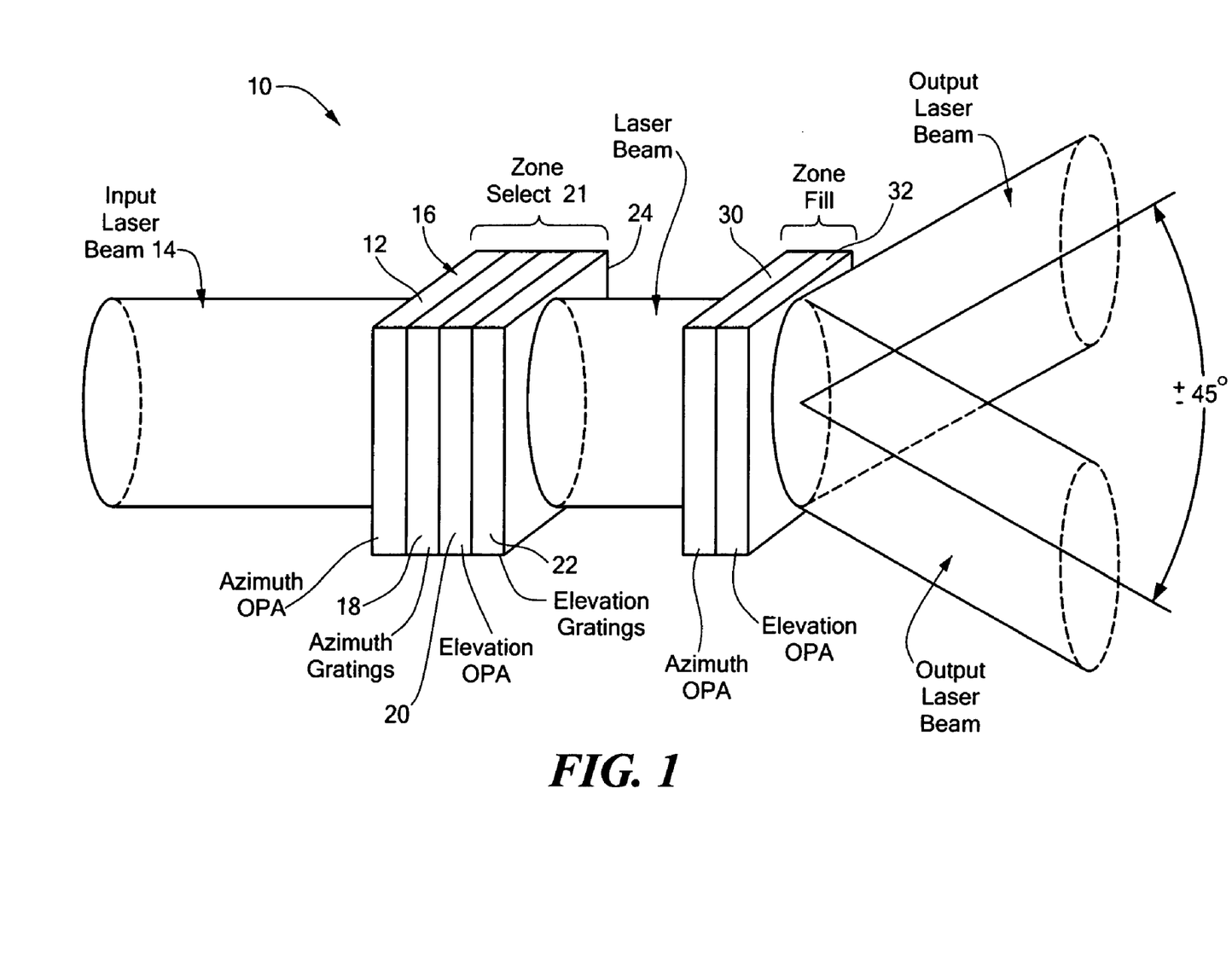
FIG. 1 is a diagrammatical sketch of a beam steering system according to the invention.

Referring now to FIG. 1, a beam steering system 10 is shown to include a first electro-optical beam steerer 12, here an optical phased array (OPA), comprising a first array of electrically controllable phase shifting elements for directing an incident beam 14, here an input laser beam, to a selected one of a plurality of first angles all disposed substantially on a common plane, here in an azimuthal plane, each one of such first angles being selected in accordance with a first electrical command fed to the phase shifting elements of the first electro-optical beam steerer 12 via bus 16. Here, the electro-optical beam steerer is of the type described in the above-identified U.S. patents and directs the beam to an angle in the azimuthal direction, or plane.

A first plurality of volume diffraction gratings 18 is provided. Here, such first plurality of volume diffraction gratings 18 is sometimes referred to for convenience, as a first grating set 18. Thus, the first grating set 18 has an internal structure, preferably holographically formed, comprising one or a plurality of volume Bragg gratings (hereinafter sometimes referred to simply as "gratings"). A volume Bragg grating is a spatially varying dielectric or magnetic susceptibility impressed within the volume of the first grating set. The variation of the susceptibility is generally in the form of a sinusoidal dependence on position planes of material having an increased susceptibility are sandwiched between planes having a decreased susceptibility. Such a grating is conveniently specified by its grating vector, which is a three-component vector directed perpendicular to the planes making up the volume Bragg grating and having a magnitude inversely proportional to the period of the sinusoidal variation of susceptibility. Each of the volume Bragg gratings within the first grating set has a diffraction grating vector, and within the first element all such vectors lie approximately in a single plane. It is a known feature of such volume Bragg gratings that light waves propagating in certain directions will be resonant with, and thus strongly diffracted by, the grating, and the set of directions which is strongly resonant lies in or near a fan of directions, herein referred to as the input space of the grating, lying approximately in a plane, this plane being perpendicular to the grating vector. It is also a known feature that the direction into which the light waves are diffracted depends on the input direction as well as on the grating vector and that the set of output directions forms a fan lying approximately in a plane, this plane also being perpendicular to the grating vector. Reference is made to U.S. Pat. No. 6,586,141, issued Jul. 1, 2003, inventors Efimov, et al. entitled "Process for production of high efficiency volume diffractive elements in photo-thermo-refractive glass". Defining the deflection of a beam as the result of subtracting a unit vector parallel to the propagation direction of the beam before deflection from a unit vector parallel to the propagation direction of the deflected beam, the beam deflection of the beam resulting from its diffraction from a grating lies along the grating vector of said grating.

Each one of the plurality of gratings of the first grating set 18 is associated with a corresponding one of a first plurality of grating vectors. The first plurality of grating vectors of the first set 18 is disposed substantially in a first plane, here the azimuthal plane. Each one of the gratings deflects optical energy incident thereon from a corresponding one of a plurality of input directions of resonance to a corresponding output direction. It should be noted that the plurality of input directions for each grating is the "input space" of that grating.

Thus, the first grating set 18 has a grating material to intercept the beam directed by the first electro-optical beam steerer 12 and steers such directed beam into one of a first plurality of directions, each one of the directions being confined substantially to a first single plane, here the azimuthal plane. Here, the first grating set 18 has azimuthal gratings and deflects the beam incident thereon in the azimuthal direction, or plane.

A second electro-optical beam steerer 20 is provided comprising a second array of electrically controllable phase shifting elements, here an optical phased array (OPA), for deflecting the beam steered by the first grating set by a selected one of a plurality of second angles, each one of such second deflections lying in a second plane preferably perpendicular to the first plane, i.e., here the elevation plane. The angle is selected in accordance with a second electrical command fed to the phase shifting elements of the second electro-optical beam steerer 20 via bus 22. Here, the electro-optical beam steerer is of the type described in the above-identified U.S. patents and deflects the beam by an angle in an elevation direction.

A second plurality of volume diffraction gratings 24 is provided. Here, such second plurality of volume diffraction gratings 24 is sometimes referred to for convenience, as a second grating set 24. The second grating set 24 is the similar to the first grating set 18 except here all of the volume Bragg gratings of the second grating set 24 have their grating vectors disposed approximately in a single plane different from the first plane, here in the elevation plane, and may have grating vectors of different magnitudes from those of grating set 18. Each one of the gratings of the second grating set deflects optical energy incident thereon from a corresponding one of a plurality of input directions of resonance to a corresponding output direction. As before, the plurality of input directions for each grating is the "input space" of that grating. The input spaces of the gratings of the second set lie in a series of approximately planar loci in angle space, and these input spaces are all approximately perpendicular to the input spaces of the first grating set.

Thus, the second grating set 24, has a grating material to intercept the beam directed by the second electro-optical beam steerer 22 and to deflect such directed beam by one of a second plurality of directions, each one of the second plurality of deflection directions being confined substantially to a second single plane, such second plane being perpendicular to the first plane. Here, the second grating set 24 has elevation gratings and deflects the beam incident thereon in the elevation direction.

More particularly, the first electro-optical beam steerer 12 directs the incident beam 14 towards the first grating set 18 in a direction resonant with a selected one of the first plurality of gratings of the first grating set 18 and the second electro-optical beam steerer 20 directs the beam steered by the first grating set 18 towards the second grating set in a direction resonant with a selected one of the second plurality of grating of the second grating set 24. Here, the grating material of the first and second grating sets is photothermorefractive glass.

Thus, assuming the incoming optical beam 14 is along the optic axis of the system 10, an electrical command signal fed to the first electro-optical beam steerer 12 directs such beam along a selected one of a plurality of angular directions; here, one of a plurality of angles within ±5 degrees from the optic axis and in the elevation plane. The angle is selected so that the beam leaving the first electro-optical beam steerer 12 will be directed along a direction of resonance with the volume gratings of the first grating set 18 such that the first grating set 18 will produce an output beam having a wavefront along a first predetermined angular direction. The first predetermined angular direction may be much greater than ±5 degrees from the direction of propagation of the incoming wavefront. It should be noted that when the final output direction direction is to be at a small angle, less than ±5 degrees from the optic axis in the present case, the input direction selected by the first electro-optical beam steerer would be such as to be out of resonance with all gratings, thereby allowing the input beam to pass through all the gratings without deflection.

The second electro-optical beam steerer 22 then directs such output beam from the first grating set 18 to within ±5 degrees. The angle is selected so that the beam leaving the second electro-optical beam steerer 22 will have a wave front along a direction of resonance with the volume gratings of the second grating set 24 such that the second grating set 24 will produce an output beam having a wavefront along a second predetermined angular direction. The second predetermined angular direction is much greater than ±5 degrees from the direction of propagation of the incoming wavefront. Here, FIG. 1 shows the output beam from system 10 being adapted to be deflected ±45 degrees from the optic axis.

In order to understand the effect of the volume grating 22, 24, consider light of wave-vector $k_1$. The wave-vector of a plane wave is defined exactly analogously to the grating vector of a grating: it is a vector perpendicular to the equiphase planes of the plane wave and having magnitude equal to the inverse of the spacing of said planes at a given, constant, phase interval. This phase interval may be taken to be one full wave or one radian of phase change, or other measure consistent with ease of calculation, but is a fixed amount in a given calculation. Let the light be traveling in a medium with a modulated relative dielectric permeability $$\epsilon_r = \epsilon_m + \epsilon_g \cos(k_g \cdot r), \quad (1)$$

where subscripts "m" and "g" refer to the medium and the grating, respectively. The modulation results in generation of spatial sidebands at wave-vectors $k_2 = k_1 \pm k_g$. If one of these sidebands is in resonance with, i.e., has the same wave-vector and temporal frequency as, a possible propagating wave, it will excite that wave, and (assuming certain design criteria are met) all of the energy in the original wave will be transferred ("diffracted") into the new wave. Since the grating is static, the frequency of these sidebands is the same as that of the original light and hence the sidebands can only radiate if $|k_2|=|k_1|$. This is a short description of Bragg scattering from a volume grating, the key physical phenomenon underlying our disclosure. Note that in this Application, the terminology that an input wave be "in resonance with" a grating is understood to be equivalent to "one of the two sidebands generated by such a wave in the presence of such a grating is such as to excite such an output propagating wave" as just described.

Figure 2A:
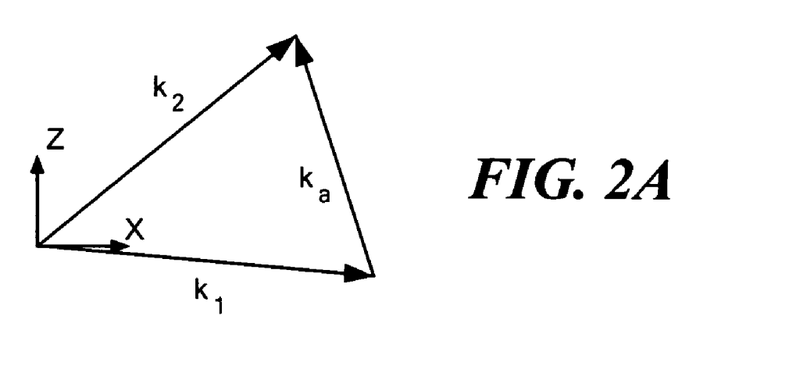
FIGS. 2A–2C are vector diagrams useful in understanding the beam steerer of FIGS. 1 and 4.
Figure 2B:
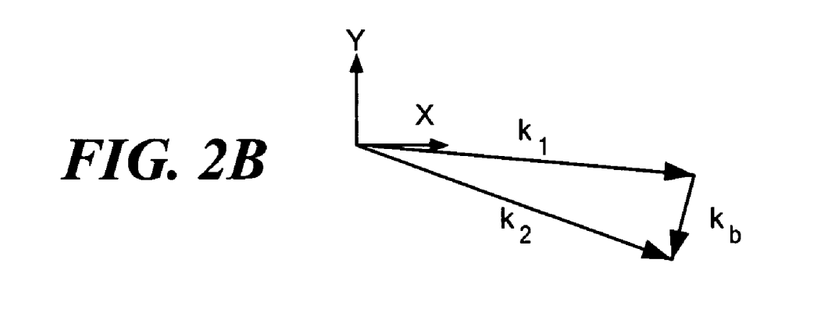
Figure 2C:
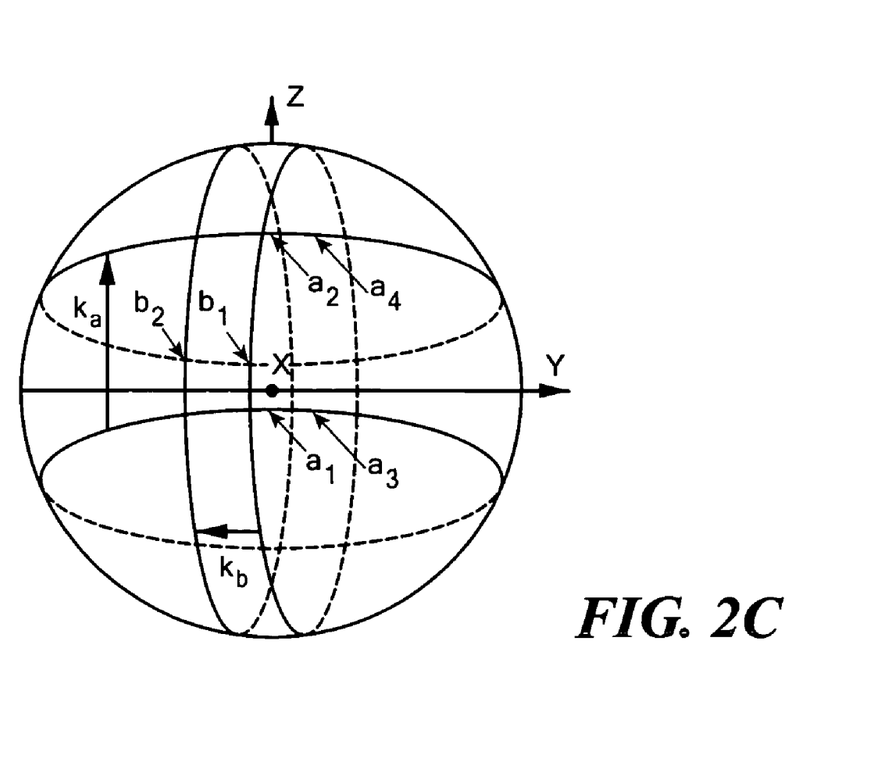

FIGS. 2A–2C show the geometry for two examples. The input and output vectors $k_1$ and $k_2$ are of equal length and thus must form an isosceles triangle having the grating vector as base, lying in any plane containing the grating vector. In FIG. 2A, the wave vector is $k_a$, chosen to lie in the XZ plane; in FIG. 2B, $k_b$, in the XY plane. In FIG. 2C we show the possible wave vectors in k space; the input and output vectors lie on a pair of equal circles (on the so-called "Ewald" sphere), lying on two planes separated by the grating vector. Both examples are shown on one sphere, and in fact both gratings could be written into the same block of material. If we send in light along the X axis (directly towards the observer in FIG. 2C), it would not be in resonance with either grating and would pass through undeflected. If it were aimed slightly downwards, at point "$a_1$", then it would be in resonance with the "a" grating and would be deflected upwards into the direction "$a_2$." Note that not only the point "$a_1$" but also any point on the same circle would be in resonance with the "a" grating. For example, light aimed in the direction "$a_3$" would be in resonance with the same grating and would be deflected, again directly upwards, but into the direction "$a_4$". Likewise, if incoming light were instead tilted slightly in the negative-Y direction, at the point "$b_1$," it would be in resonance with the "b" grating and would be deflected into the direction "$b_2$."

The grating extends over a distance T, the thickness of the slab in which it is written. This results in a finite angular spread of the resonance condition: the input wave-vector must lie within a band of directions centered on one of the circles in FIG. 2C. We will refer to this as the "input space" for that grating. The angular width δ of the band is given approximately $\sin\delta = n\lambda/T \sin\theta$, where λ is the wavelength, n is the index of refraction of the material in which the grating lies, and θ is the deflection angle of the scattering (outside of the grating material). For example, at 1.5μ wavelength and 2 mm thickness and with grating material having index of refraction n=1.5, beam deflection θ of 5° results in an input space forming a band about 0.7° wide; deflection of 50°, about 0.07°.

The non-zero width δ of the input space is a consequence of the finite thickness of the grating material, which imparts a corresponding uncertainty or "blurring" of the grating vector. This uncertainty is purely in the component of the grating vector which is normal to the surface of the grating material, which is assumed for simplicity to be a plane parallel slab. The grating slab is taken in this analysis to be of infinite extent in the transverse direction and the incident waves are taken to be plane waves, also idealized to have infinite extent in the transverse direction. These assumptions are the usual ones employed in analysis of electromagnetic wave propagation problems. With these assumptions, the precise formulation of the scattering condition is as follows: the diffraction must satisfy the transverse boundary condition $$u \times (k_1 + k_g - k_2) = 0 \quad (2)$$

where u is the normal to the slab and the operator is the vector cross product. This equation provides two constraints on the vector $(k_1 + k_g - k_2)$; the third constraint is not a strict one owing to the existence of components of the full Fourier transform of the grating having a small range of values parallel to u, due to the finite thickness of the grating as previously mentioned. As the input wave vector $k_1$ runs over the input space, the output wave vectors $k_2$ lie within an output space which is a band of width approximately equal to δ. Note that for a given $k_1$ the value of $k_2$ is fixed; that is, there is no blurring or broadening of a given wave by the scattering, but rather the efficiency of the scattering varies, being 100% at the center of the band.

Figure 3A:
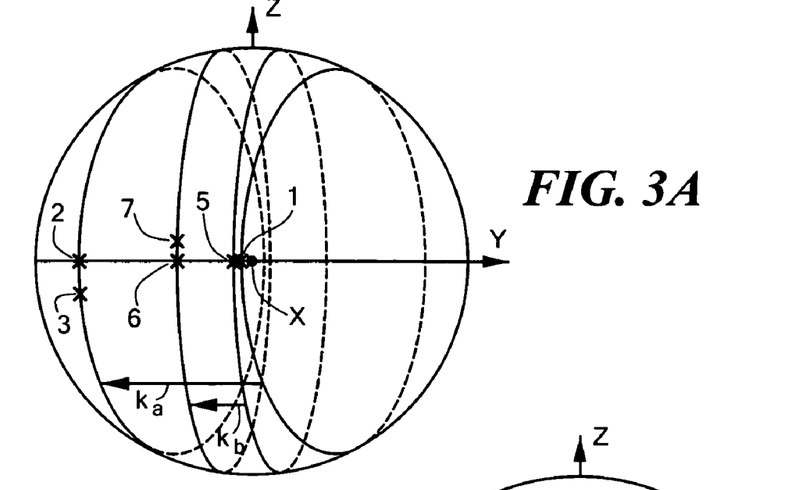
FIGS. 3A–3C are vector diagrams useful in understanding the beam steerer of FIGS. 1 and 4.

Referring again to FIG. 1, the first electro-optical beam steerer 12, the first grating set 18, the second electro-optical beam steerer 20, and the second grating set 24 provide a two-stage or "cascaded" zone selector 21. A "zone" is a range of output angles accessible from the "zone fill" subsystem 23, centered on one of the discrete directions available from the cascaded grating zone selector. In the first stage, the first electro-optical beam steerer 12 deflects the input beam into the input space of a chosen one of (in the present example) about 18 gratings of the first grating set 18, all of which deflect in the same direction by different amounts (some positive, some negative). This results in a beam deflected into one of a fan of directions lying up to 45° from the incident direction. For this example the fan, with spacing 5°, lies on the equator of the sphere in FIGS. 3A, 3C, and 3B. For clarity we show in FIGS. 3A–3C the scattering vectors and the input and output spaces of only two gratings; in FIGS. 3A and 3C these are azimuth-deflecting gratings, whereas in FIG. 3B they are elevation-deflecting gratings. The incident wave is assumed to be directed along the X axis, represented by the dot at the center in FIGS. 3A–3C, and it is deflected by the electro-optical beam steerer 12 to a point such as "1" or "5" where the input space of one of the gratings crosses the equator. It is then scattered to corresponding point "2" or "6", respectively (or other points corresponding to the remaining gratings, which are not shown for simplicity), which are shown as small crosses in FIG. 3A. Then, the second electro-optical beam steerer 22 deflects the wave to place it into the input space of any chosen one of the second set of gratings of the second grating set 24, which are oriented to deflect the light by various amounts in the direction perpendicular to the first fan. One such possible deflection, shown in FIG. 3A, is from "2" to "3". This would be chosen if the system were intended to ultimately finish with the light at direction "4" in FIG. 3B. In this case, the ray entering the second grating set 24 would lie in the input space of grating "c" of grating set 24 and would be deflected upwards to direction "4".

Figure 3B:
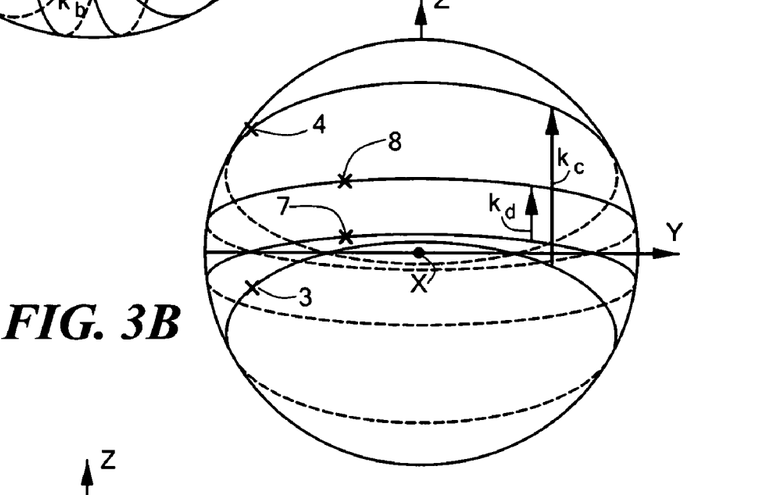
Figure 3C:
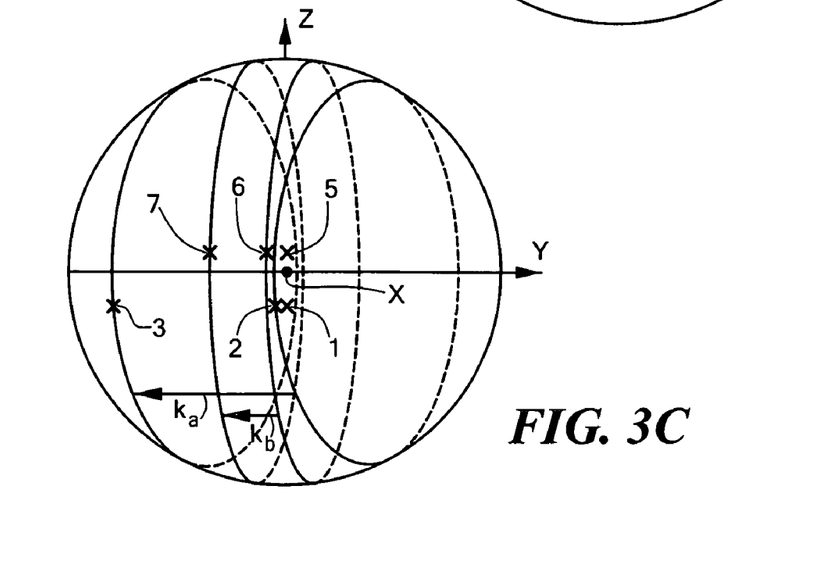

In the case where the first electro-optical beam steerer 12 deflects the beam to point "5" instead of point "1", the second electro-optical beam steerer 22 could be commanded to deflect the light waves upwards, from "6" to "7", so that upon entering the second grating set, whose operation is shown in FIG. 3B, they would be in resonance with grating "d" and would be deflected upwards from direction "7" to direction "8".

Not shown are the two other possibilities now to be described. If the second electro-optical beam steerer were operating on lightwaves at point 2, but deflected them downwards by a smaller amount so as to lie (in FIG. 3B) on the input space of grating "d" instead of grating "c", then they would be deflected upwards by a lesser amount and would lie in a different zone than before. Likewise, if the upwards deflection from point "6" to point "7" were replaced by a different commanded deflection in electro-optical beam steerer 22 so as to place the light waves in the input space of grating "c" in grating set 2, then the resulting upwards deflection of the light waves would be larger and they would end up on the output space of grating "c", grating set 2, which is the same output space as point "4" in FIG. 3B. Thus each output space of the second grating set is used in multiple zones, the zone selected depending on the the deflection occurring in the first grating set also.

The zone selector 21 described here, in this example, would deflect a beam to e.g. direction "4," in FIG. 3B, as follows.

Bring in the input wave along the X axis;
Activate the first electro-optical beam steerer 12 to deflect the light to direction "1", thereby selecting the grating from the first set which diffracts the beam to direction "2"; and then
Activate the second electro-optical beam steerer 22 to deflect the beam downwards to point "3", in the input space of grating "c" in FIG. 3B, which completes the operation by diffracting the beam to "4."

It should be noted that the second electro-optical beam steerer 22 both selects the second grating and compensates for the curvature (visible in the Figures) of the various input spaces.

Figure 4:
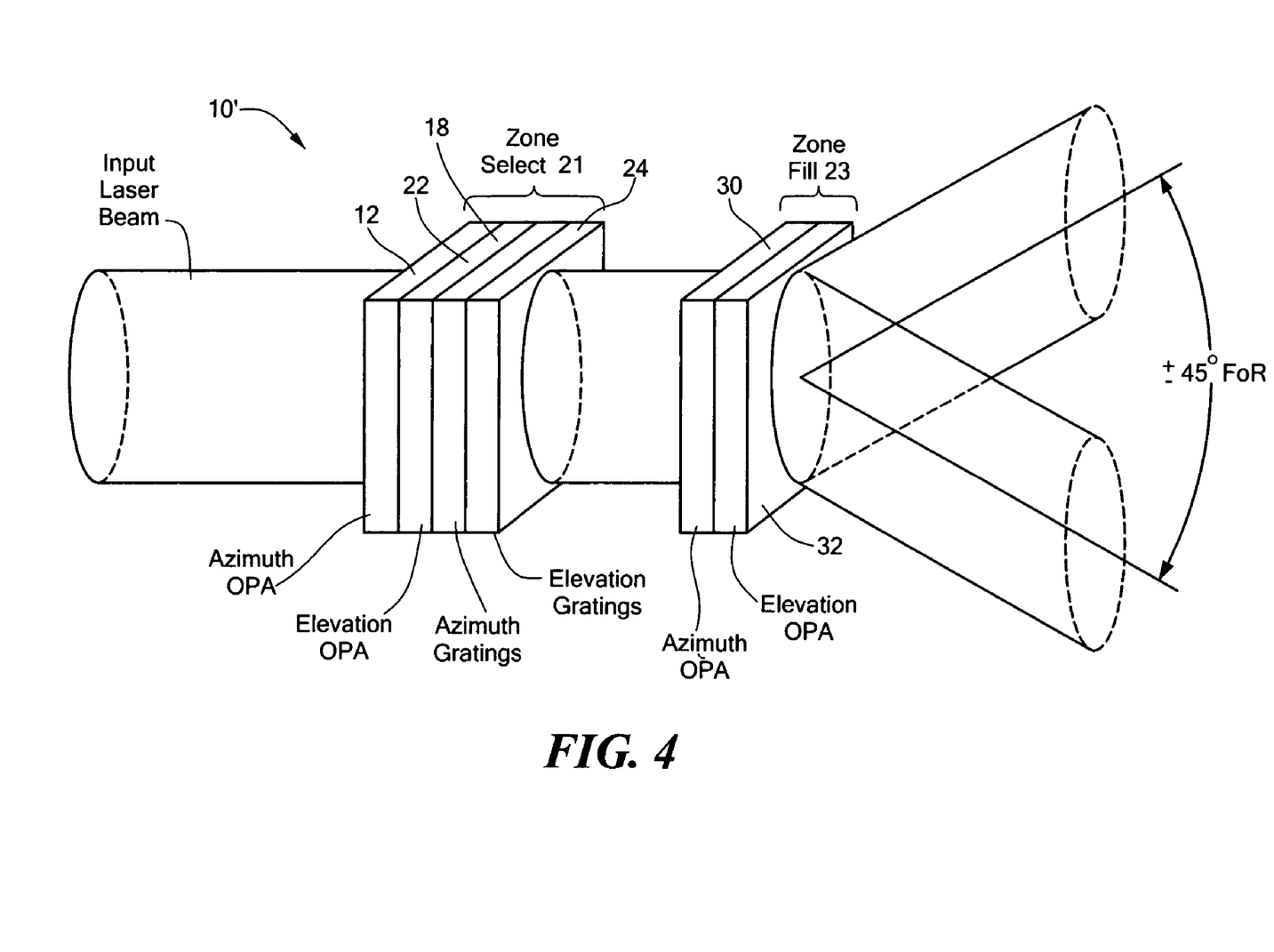
FIG. 4 is a diagrammatical sketch of a beam steering system according to another embodiment of the invention.
Figure 4A:
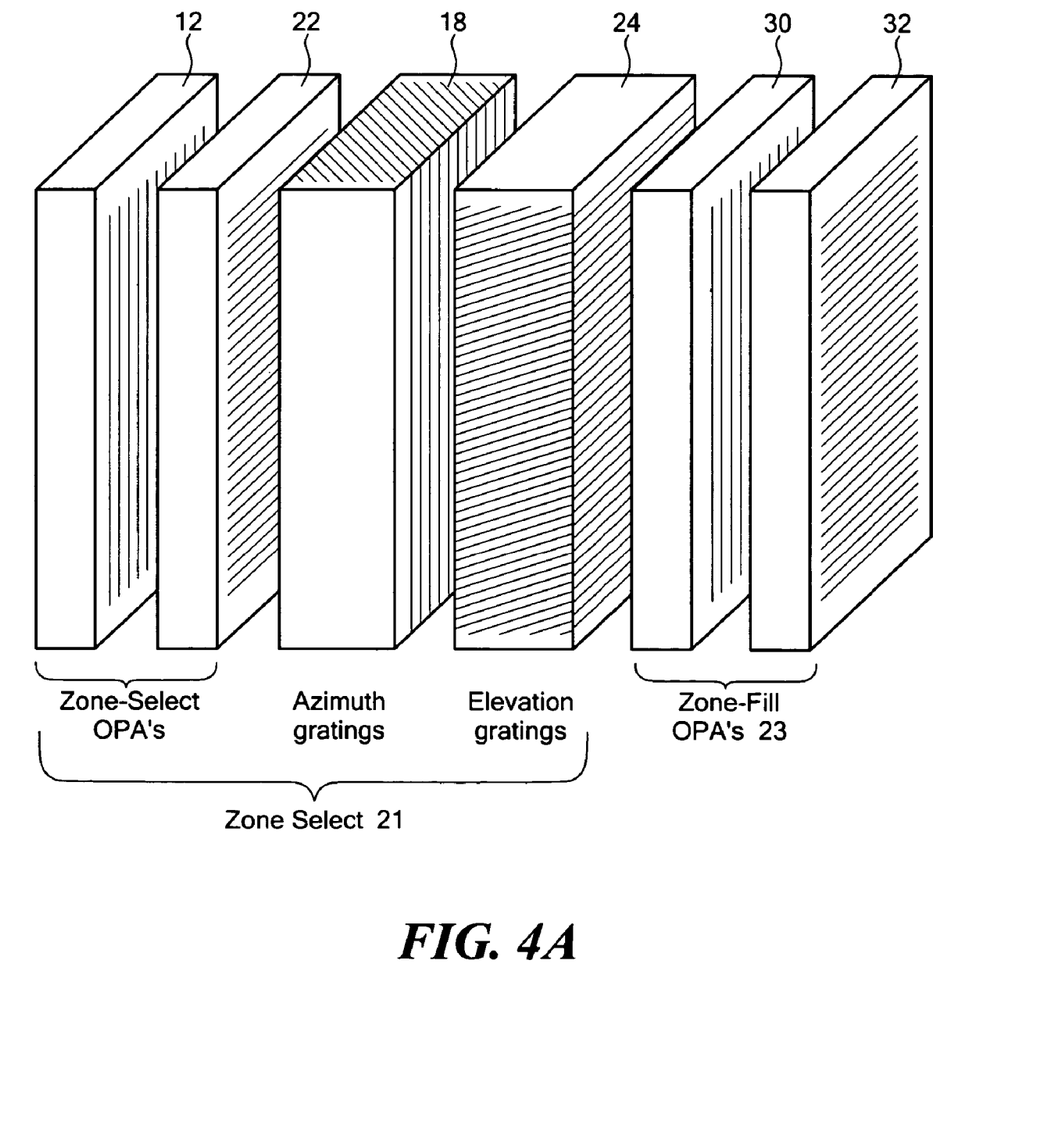
FIG. 4A is an exploded view of the zone select section and zone fill section of FIG. 4.

Referring now to FIG. 4, a beam steering system 10' is provided. Here, in this embodiment, the electro-optical beam steering arrangement (i.e., the first electro-optical beam steerer 12 and the second electro-optical beam steerer 22) is disposed in front of both the first plurality of gratings 18 and the second plurality of gratings 24, an exploded view of the zone select section 21 and zone fill section 23 being shown in FIG. 4A.

In this case, the electro-optical beam steering arrangement placed before the first grating set has the ability to deflect light waves in azimuth and in elevation. Thus, the beam steering system 10' is provided having a first plurality of volume diffraction gratings 18, each one of such gratings being associated with a corresponding one of a first plurality of grating vectors. The first plurality of grating vectors 18 is disposed substantially in a first plane, here the azimuth plane. Each one of the gratings diffracts optical energy incident thereon from a corresponding input direction of resonance to a corresponding output direction. A second plurality of volume diffraction gratings 24 is provided. Each one of such second plurality of volume diffraction gratings 24 is associated with a corresponding one of a second plurality of grating vectors. The second plurality of grating vectors is disposed substantially in a second plane different from the first plane, here the elevation plane. Each one of the second plurality of grating 24 diffracts optical energy incident thereon from a corresponding input direction of resonance to a corresponding output direction. The system includes a beam steering arrangement 12, 22 for directing a beam of optical energy to a selected one of the first plurality of gratings 18 along the corresponding input direction of resonance for the selected one of the first plurality of gratings 18, said direction being selected to provide the output direction from the first plurality of gratings 18 to be substantially equal to the input direction of resonance for the selected one of the second plurality of gratings 23. In other words, in this arrangement it is unnecessary to have a portion of the electro-optical beam steering arrangement between the two grating sets. Operation of this arrangement may be understood by reference to FIGS. 3C and 3B.

Consider steering to the direction "4" shown in FIG. 3B as before. This requires that the light enter the second grating set along direction "3". To achieve this, we begin as before with lightwaves incident upon the electro-optical beam steering arrangement along the X axis, shown in FIG. 3C. The electro-optical beam steering arrangement deflects the beam in elevation, to direction "1", and in azimuth, to direction "2". It is not necessary that these two deflections be along elevation and azimuth, but only that a two-dimensional range of directions be selectable, resulting in an outgoing wave in direction "2". This wave will be in resonance with grating "a" of the first grating set and will be deflected by that grating to the direction "3". The light exits the first grating set and enters the second grating set travelling in direction "3". This direction is not on the equator of the sphere because of the prior deflection in elevation. Instead its direction is chosen by said elevation deflection to lie in the input space of the selected grating from the second grating set, here grating "c" of that set. It is thus deflected to the desired final direction, "4", as shown in FIG. 3B. Also illustrated is a different setting of the electro-optical beam steering arrangement, chosen to result in a final output wave in direction "8", FIG. 3B. In this case the electro-optical beam steering arrangement selects deflections from the X axis to direction "5" and then to direction "6", in FIG. 3C. This places the wave in resonance with grating "b" of the first grating set, resulting in a deflection to direction "7". The wave is then pre-positioned so that when it enters grating set 2, it is already in resonance with grating "d".

To put it another way, each one of the gratings in the first grating set 18 is associated with a corresponding one of a first plurality of grating vectors. The first plurality of grating vectors is disposed substantially in a first plane. Each one of the gratings in the first grating set 18 is arranged to diffract optical energy incident thereon from any one of a plurality of input directions of resonance to a corresponding one of a plurality of output directions. The system includes a second plurality of volume diffraction gratings, i.e., the second grating set 24. Each one of such second plurality of volume diffraction gratings is associated with a corresponding one of a second plurality of grating vectors. The second plurality of grating vectors is substantially in a second plane different from the first plane. Each one of the second plurality of gratings (i.e., the second grating set 24) is arranged to diffract optical energy incident thereon from any one of a plurality of input directions of resonance to a corresponding one of a plurality of output directions. Also provided is a beam steering arrangement for directing a beam of optical energy to a selected one of the first plurality of gratings (i.e., grating set 18) along a selected one of the plurality of input directions of resonance for the selected one of the first plurality of gratings (i.e., grating set 18), said one of the input directions of resonance being selected to provide the corresponding one of the plurality of output directions from the first plurality of gratings (i.e., grating set 18) to be substantially equal to a selected one of the plurality of input directions of resonance for the selected one of the second plurality of gratings (i.e., grating set 24).

Referring again to FIG. 1 or 4, the output beam from the zone selector 21 is fed to a zone-fill section 23, having cascaded azimuth electro-optical beam steerer 30 followed by an elevation electro-optical beam steerer 32.

A number of embodiments of the invention have been described. For example, the first and second planes referred to above, need not be perpendicular to each other. Thus, it will be understood that various modifications may be made without departing from the spirit and scope of the invention. Accordingly, other embodiments are within the scope of the following claims.

What is claimed is:

1. A beam steering system, comprising:
a first electro-optical beam steerer, comprising a first array of electrically controllable phase shifting elements for directing an incident beam to a selected one of a plurality of first angles in a first plane, each one of such first angles being selected in accordance with a first electrical command fed to the phase shifting elements of the first electro-optical beam steerer;
a first grating set to intercept the beam directed by the first electro-optical beam steerer and to steer such directed beam into one of a first plurality of directions in the first plane, each one of the directions being confined substantially to the first plane;
a second grating set to intercept the beam directed by the first electro-optical beam steerer and first grating set and to deflect such directed beam into one of a second plurality of directions, each one of the second plurality of deflections being confined substantially to a second plane, such second plane being different from the first plane; and
a second electro-optical beam steerer comprising a second array of electrically controllable phase shifting elements for deflecting the beam steered by said first grating set by a selected one of a plurality of second angles in a second plane different from the first plane, each one of such second angles being selected in accordance with a second electrical command fed to the phase shifting elements of the second electro-optical beam steerer.

2. The system recited in claim 1 wherein the second plane is perpendicular to the first plane.

3. A beam steering system, comprising:
a first plurality of volume diffraction gratings, each one of such gratings being associated with a corresponding one of a first plurality of grating vectors, such first plurality of grating vectors being disposed substantially in a first plane, each one of the gratings being arranged to diffract optical energy incident thereon from any one of a plurality of input directions of resonance to a corresponding one of a plurality of output directions;
a second plurality of volume diffraction gratings, each one of such second plurality of volume diffraction gratings being associated with a corresponding one of a second plurality of grating vectors, such second plurality of grating vectors being disposed substantially in a second plane different from the first plane, each one of the second plurality of gratings being arranged to diffract optical energy incident thereon from any one of a plurality of input directions of resonance to a corresponding one of a plurality of output directions; and
a beam steering arrangement comprising arrays of electronically controllable phase shifting elements for deflecting a beam of optical energy incident on the beam steering system such that it is directed first to a selected one of the first plurality of gratings along a selected one of the plurality of input directions of resonance for the selected one of the first plurality of gratings and then directed to the second plurality of gratings in a direction substantially equal to a selected one of the plurality of input directions of resonance for a selected one of the second plurality of gratings.

4. The beam steering system recited in claim 3 wherein the first plurality of volume diffraction gratings and the second plurality of volume diffraction gratings are non-controllable.

5. A beam steering system, comprising:
a first plurality of volume diffraction gratings, each one of said gratings being associated with a corresponding one of a first plurality of grating vectors, each one of the gratings being arranged to diffract optical energy incident thereon from any one of a plurality of input directions of resonance to a corresponding one of a plurality of output directions;

a second plurality of volume diffraction gratings, each one of said second plurality of volume diffraction gratings being associated with a corresponding one of a second plurality of grating vectors, each one of the second plurality of gratings being arranged to diffract optical energy incident thereon from any one of a plurality of input directions of resonance to a corresponding one of a plurality of output directions; and a beam steering arrangement comprising arrays of electronically controllable phase shifting elements for deflecting a beam of optical energy incident on the beam steering system such that it is directed first to a selected one of the first plurality of gratings along a selected one of the plurality of input directions of resonance for the selected one of the first plurality of gratings and then directed to the second plurality of gratings in a direction substantially equal to a selected one of the plurality of input directions of resonance for a selected one of the second plurality of gratings.

6. The beam steering system recited in claim 5 wherein the first plurality of volume diffraction gratings and the second plurality of volume diffraction gratings are non-controllable.

* * * * *

UNITED STATES PATENT AND TRADEMARK OFFICE
CERTIFICATE OF CORRECTION

PATENT NO. : 7,215,472 B2  Page 1 of 1
APPLICATION NO. : 10/916916
DATED : May 8, 2007
INVENTOR(S) : Smith et al.

It is certified that error appears in the above-identified patent and that said Letters Patent is hereby corrected as shown below:

Col. 1, line 19, delete "et al. all" and replace with --et al., all--.
Col. 3, line 48, delete "element all" and replace with -- element, all--.
Col. 3, line 39, delete "position" and replace with -- position: --.
Col. 3, line 62, delete "Efimov, et al. entitled," and replace with -- Efimov, et al., entitled --.
Col. 4, line 38-39, delete "is the similar" and replace with --is similar--.
Col. 5, line 2, delete "of grating" and replace with --of gratings--.
Col. 5, line 20, delete "direction direction is" and replace with --direction is--.
Col. 5, line 40-41, delete "volume grating 22, 24," and replace with -- volume gratings 22, 24,--.
Col. 6, line 27, delete "at the point "$b_1$,"" and replace with -- at point "$b_1$,"--.
Col. 7, line 3, delete ""$K_1$ the" and replace with --"$K_1$, the"--.
Col. 7, line 24, delete "3C these" and replace with --3C, these--.
Col. 7, line 55-56, delete "deflected them downwards" and replace with --deflected downwards--.
Col. 8, line 44, delete "grating 24" and replace with --gratings 24--.
Col. 8, line 55, delete "arrangement it" and replace with --arrangement, it--.
Col. 9, line 14, delete "case the" and replace with --case, the--.

Signed and Sealed this

Twenty-eighth Day of August, 2007

JON W. DUDAS
*Director of the United States Patent and Trademark Office*